United States Patent

Miyamae et al.

[11] Patent Number: 5,901,133
[45] Date of Patent: May 4, 1999

[54] OBJECTIVE LENS ACTUATOR

[75] Inventors: Akira Miyamae; Hisao Isobe, both of Nagano, Japan

[73] Assignee: Kabushiki Kaisha Sankyo Seiki Seisakusho, Nagano, Japan

[21] Appl. No.: 08/872,141

[22] Filed: Jun. 10, 1997

Related U.S. Application Data

[63] Continuation of application No. 08/399,639, Mar. 7, 1995, abandoned.

[30] Foreign Application Priority Data

Mar. 7, 1994 [JP] Japan ................................. 6-062070

[51] Int. Cl.⁶ ........................................................ G11B 7/09
[52] U.S. Cl. ............................................................ 369/247
[58] Field of Search .............................. 369/44.11, 44.14, 369/44.15, 44.21, 44.22, 247, 248, 251; 359/813, 819, 823

[56] References Cited

U.S. PATENT DOCUMENTS

| | | | |
|---|---|---|---|
| 4,473,274 | 9/1984 | Yano et al. | 350/255 |
| 4,571,026 | 2/1986 | Maruta | 350/247 |
| 4,679,903 | 7/1987 | Kasahara et al. | 350/247 |
| 4,687,296 | 8/1987 | Terayama et al. | 350/247 |
| 4,818,066 | 4/1989 | Nose | 350/247 |
| 4,861,138 | 8/1989 | Suzuki | 350/255 |
| 4,962,999 | 10/1990 | Kasuga | 350/247 |
| 5,182,738 | 1/1993 | Yoshikawa | 369/44.14 |

FOREIGN PATENT DOCUMENTS

| | | |
|---|---|---|
| 1-256033 | 10/1989 | Japan . |
| 3-113839 | 5/1991 | Japan . |
| 3-1653311 | 7/1991 | Japan . |
| 4-206041 | 7/1992 | Japan . |
| 4-325931 | 11/1992 | Japan . |
| 5-047008 | 2/1993 | Japan . |
| 5-250697 | 9/1993 | Japan . |

*Primary Examiner*—William J. Klimowicz
*Attorney, Agent, or Firm*—Sughrue, Mion, Zinn, Macpeak & Seas, PLLC

[57] ABSTRACT

An objective lens actuator including an objective lens holding body for holding an objective lens, and a sheetlike drive coil arranged on an outer circumferential surface of the objective lens holding body. The objective lens holding body is rotatable about a shaft and slidable along the shaft, and a vibration absorbing member is interposed between a portion of the objective lens holding body and the sheetlike drive coil, the portion being opposite to the objective lens with the shaft interposed therebetween.

12 Claims, 3 Drawing Sheets

5,901,133

OBJECTIVE LENS ACTUATOR

This is a Continuation of application Ser. No. 08/399,639 filed Mar. 7, 1995, now abandoned.

BACKGROUND OF THE INVENTION

1. Field of the invention

The invention relates to objective lens actuators.

2. Related art

Conventionally, an optical recording and reproducing apparatus, such as an optical disk device using an optical disk as a recording medium, employs an optical pickup for writing data signals to and reading the data signal from the disk. An objective lens actuator is employed in this optical pickup to correctly converge a laser beam onto a data bit on the disk. FIGS. 6 and 7 show an example of such an objective lens actuator.

FIGS. 6 and 7 show the objective lens actuator recited in Unexamined Japanese Patent Publication No. Hei. 3-165331. As shown in FIG. 6, an acrylate resin member 140 is arranged along the entire circumference between an objective lens holding body 131 and control coils 134, 135, so that this acrylate resin member 140 can increase the damping ratio of a movable part to thereby control resonance peaks to low values.

In FIGS. 6 and 7, a circular recess 121 is formed on a base 120. An optical beam through hole 122 is formed in a part of this recess 121 so as to pass the optical beam from a light source therethrough. A mounting hole 124 for securing a support shaft 123 is arranged at the center of the recess 121. A rubber spring 125 is arranged inside the recess 121 on a side opposite to the optical beam through hole 122 with the mounting hole 124 interposed therebetween. Further, arcuate magnet holding strips 126a, 126b are arranged inside the recess 121 so as to project upward at such positions as to confront each other while interposing a line connecting the center of the optical beam through hole 122 to the center of the support shaft 123 therebetween. Similarly arcuate magnetic path strips 127a, 127b are formed on outer circumferential sides of the magnet holding strips 126a, 126b outside the recess 121.

A bearing 128 that is rotatable about and vertically movable along the axis of the support shaft 123 is fitted into the thus fixed support shaft 123. The central portion of a substantially rectangular objective lens holding body 131 is coupled to the bearing 128. An objective lens 129 is set into an upper portion of an optical beam injection hole 139 arranged in this objective lens holding body 131. The objective lens 129 is set into the objective lens holding body 131 at a position corresponding to the optical beam through hole 122, and a balancer 130 is set into the objective lens holding body 131 at a position corresponding to the rubber spring 125. A holding pin 132 provided at the bottom of the balancer 130 is coupled to the rubber spring 125. The coupling of the holding pin 132 to the rubber spring 125 allows the objective lens holding body 131 to return to a predetermined position at all times every time the objective lens holding body 131 rotates or moves vertically. Arcuate magnets 133a, 133b are secured to the outer circumferences of the magnet holding strips 126a, 126b, respectively. A gap is provided between the outer circumferences of the magnets 133a, 133b and the magnetic path strips 127a, 127b.

A ringlike wound focusing control coil 134 is secured to the outer circumference of the objective lens holding body 131 through the acrylate resin member 140. On the outer circumference of the focusing control coil 134 is the tracking control coil 135, which is formed by coupling four arcuately shaped coils to one another at a predetermined interval. Both coils 134 and 135 are placed in a magnetic field formed between the magnets 133a, 133b and the magnetic path strips 127a, 127b.

A cover 136 is put over the whole body of the thus set components. Windows 137, 138 are formed at positions corresponding to the objective lens 129 and the bearing 128 as well as to the balancer 130 on the upper surface of the cover 136. The window 137 functions not only as a member for transmitting an optical beam past the objective lens 129 but also as a member for preventing the bearing 128 from interfering with the cover 136 when the bearing 128 makes an upward movement together with the objective lens holding member 131.

In the aforementioned construction, an optical beam is injected from the light source, and the injected optical beam is converged on a data recording medium through the objective lens 129 so that optical beam spot displacement as well as track groove displacement on the recording medium surface are detected. Then, currents corresponding to the detected displacements are applied to the focusing control coil 134 and the tracking control coil 135, respectively, to utilize magnetic flux in the magnetic circuit formed by the magnets 133a, 133b and the magnetic path strips 127a, 127b, so that the objective lens is moved in the focusing direction as well as in the tracking direction by causing the objective lens holding body 131 to either vertically move along or rotate about the axis of the support shaft 123, the objective lens holding body having both coils being secured to the outer circumference thereof.

Since the acrylate resin member 140 is interposed between the focusing control coil 134 and the objective lens holing body 131 in this case, the damping ratio of a movable part consisting of the objective lens 129, the objective lens holding body 131, the bearing 128, the acrylate resin member 140, the focusing control coil 134, the tracking control coil 135, and the balancer 130 can be increased, so that it is not likely to increase resonance peaks at high resonant frequencies of the movable part in the focusing direction and in the tracking direction, nor is it likely to impair the stability of the servo motor.

However, the objective lens actuator disclosed in Unexamined Japanese Patent Publication No. Hei. 3-165331 has the following problems.

The acrylate resin member 140 is interposed between the magnets 133a, 133b and the magnetic path strips 127a, 127b, and the presence of the acrylate resin member 140 leads to an increase in the distance between the magnets 133a, 133b and the magnetic path strips 127a, 127b, which in turn imposes the problem of reduction in magnetic characteristics.

Further, this acrylate resin member 140 does not provide sufficient damping, and the operation of mounting the acrylate resin member 140 is cumbersome, which is another problem. This problem is likewise encountered when, e.g., an adhesive member or the like is used as a resonance damping means other than the acrylate resin member 140.

SUMMARY OF THE INVENTION

Therefore, a first object of the invention is to provide an objective lens actuator that can improve stability in servo performance by implementing good vibration absorption to allow resonance peaks at high resonant frequencies to be controlled without impairing the magnetic characteristics.

A second object of the invention is to provide an objective lens actuator which not only can implement good vibration absorption but also in which a vibration absorbing member can be mounted with ease.

According to an aspect of the present invention, there is provided an objective lens actuator comprising: an objective lens holding body for holding an objective lens, the objective lens holding body being rotatable about a shaft and slidable along the shaft; a sheetlike drive coil disposed on an outer circumferential surface of the objective lens holding body; and a vibration absorbing member interposed between a predetermined portion of the objective lens holding body and the sheetlike drive coil, the predetermined portion being opposite to the objective lens while interposing the shaft therebetween.

As described in the foregoing, the objective lens actuator of the invention is provided as interposing a vibration absorbing member between a portion of the objective lens holding body and the sheetlike drive coil, the portion being opposite to the objective lens while interposing the shaft therebetween. Therefore, the vibration absorbing member is not present between the magnet and the yoke, and in addition the absence of the vibration absorbing member allows the magnet to be disposed closer to the yoke. As a result, vibrations can be absorbed satisfactorily without impairing the magnetic characteristics, and stability in servo performance can be improved by controlling resonance peaks at high resonant frequencies.

DETAILED DESCRIPTION OF THE PREFERRED EMBODIMENTS

Embodiments of the invention will now be described with reference to the drawings.

Figure 1:
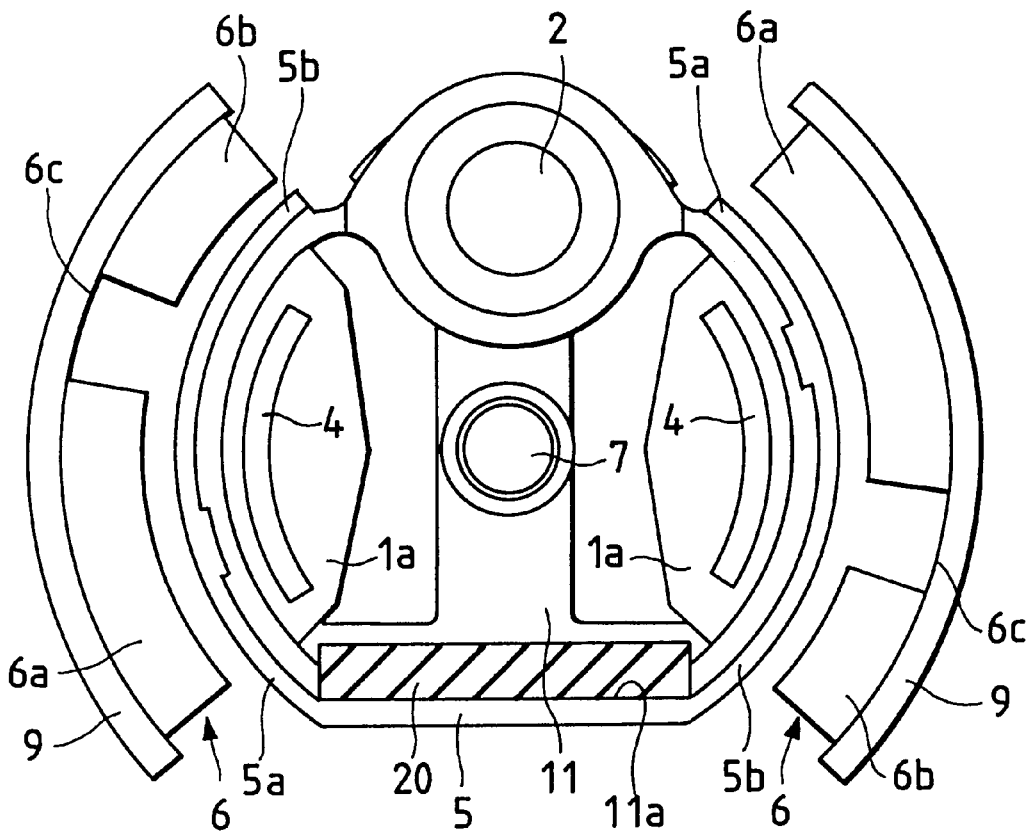
FIG. 1 is a plan view of an objective lens actuator, which is an embodiment of the invention.
Figure 2:
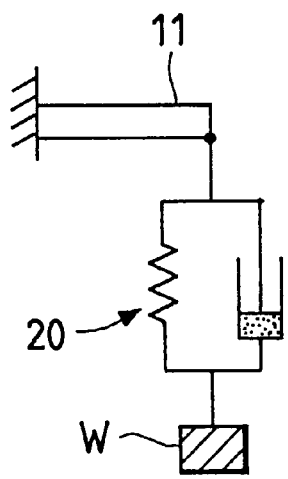
FIG. 2 is a schematic diagram illustrative of the principle of vibration absorption in the first embodiment.

FIG. 1 is a plan view of an objective lens, which is a first embodiment of the invention; and FIG. 2 is a schematic diagram illustrative of the principle of vibration absorption in the first embodiment.

In FIG. 1, reference numeral 11 denotes a lens holder serving as an objective lens holder. This holder 11 is supported so as to be rotatable about a fixed shaft 7 and movable along the shaft 7. An objective lens 2 is mounted on the lens holder 11 in such a manner that the optical axis thereof runs in parallel with the shaft 7. A sheetlike drive coil 5 is bonded to almost all the outer circumference of the lens holder 11. The sheetlike drive coil 5 includes: focusing drive coils 5a and tracking drive coils 5b. The outer circumferential surface of the lens holder 11 to which the sheetlike drive coil 5 is secured is a common, continuous surface that is concentric with the shaft 7. The sheetlike drive coil 5 is secured to the lens holder 11 while curved along this continuous surface.

The shaft 7 is fixed on the bottom of an outer yoke 9 that serves as a fixing member. Both sides of the outer yoke 9 are fanlike while interposing the shaft 7 therebetween, and the fanlike outer circumferential edge portions are bent upright so as to confront the respective coils 5a, 5b. An arcuate magnet 6 is fixed to the inner surfaces of the upright portions of the outer yoke 9. This magnet 6 is divided into focusing magnet portions 6a and tracking magnet portions 6b while interposing grooves 6c as boundaries between the magnet portions 6a and 6b. The focusing magnet portion 6a is magnetized so that the N pole and the S pole are lined up in the direction of the shaft 7, whereas the tracking magnet portion 6b is magnetized so that the N pole and the S pole are lined up along the circumference thereof so as to perpendicularly cross the direction of magnetization of the focusing magnet portion 6a. The respective magnet portions 6a, 6b are thus arranged on continuous, common surfaces.

From the bottom of the outer yoke 9 projects an inner yoke 4 toward the side of one viewing the sheet surface of FIG. 1. In a manner similar to the outer yoke 9, both sides of the inner yoke 4 are fanlike while interposing the shaft 7 therebetween, and the fanlike outer circumferential edge portions are bent upright. The upright portions not only pass through window portions 1a formed in the lens holder 11 with some clearance, but also confront the magnet portions 6a, 6b with the sheetlike drive coil 5 interposed therebetween. As described above, the inner yoke 4, the sheetlike drive coil 5, the magnet 6, the outer yoke 9 are lined up along arcs subtending the shaft 7 from the inside in this order, and a substantially closed magnetic path passing therethrough is therefore formed.

By applying a drive current to the focusing drive coil 5a, the drive current and a magnetic flux produced within the magnetic circuit generates a thrust, so that the objective lens 2 moves in the direction of the optical axis thereof together with the lens holder 11 to effect the focusing operation. By applying a drive current to the tracking drive coil 5b, the drive current and a magnetic flux produced within the magnetic circuit generates a thrust, so that the objective lens 2 is driven in the tracking direction together with the lens holder 11 to effect the tracking operation. It should be noted that the magnet 6 maybe mounted on the inner yoke 4, and not on the outer yoke 9, or on both yokes.

A gap 11a is provided between a portion of the lens holder 11 and the sheetlike drive coil 5, the portion being opposite to the objective lens 2 with the shaft 7 interposed. A vibration absorbing member 20 is filled in the gap 11a.

Here, the vibration absorbing member 20 is made of, e.g., rubber, MORUTOPUREN, or the like, and is designed to function as a dynamic absorber in a manner similar to the case where a weight W is attached to the lens holder 11 by giving freedom in deformation to the sheetlike drive coil 5 as shown in FIG. 2.

As described above, in the first embodiment the vibration absorbing member 20 is interposed between the portion of the lens holder 11 and the sheetlike drive coil 5, the portion being opposite to the objective lens 2 with the shaft 7 interposed therebetween. Therefore, no vibration absorbing member is interposed between the magnet 6 and the inner yoke 4, and the absence of the vibration absorbing member thus allows the magnet 6 to be positioned closer to the inner yoke 4, which in turn does not impair magnetic characteristics, satisfies vibration absorbing requirements, and improves stability in servo performance by controlling resonance peaks at high resonant frequencies.

While a portion of the sheetlike drive coil 5 forming the gap 11a is made flat with respect to the other arcuate portions (e.g., portions confronting the magnet 6 and the like) in FIG. 1, such portion may be likewise arcuate so as to be continuous from the other arcuate portions as long as a gap used to fill the vibration absorbing member 20 can be formed. In addition, of course, the invention is applicable to an objective lens actuator having the magnet 6 mounted on the inner yoke 4, and not on the outer yoke 9, as well as to an objective lens actuator having the magnet 6 mounted on both the inner yoke 4 and the outer yoke 9.

Further, it may be noted that the vibration absorbing member 20 may also be made of resin-based elastic bodies such as elastomer, felt, and gel in addition to rubber and MORUTOPUREN.

Figure 3A:
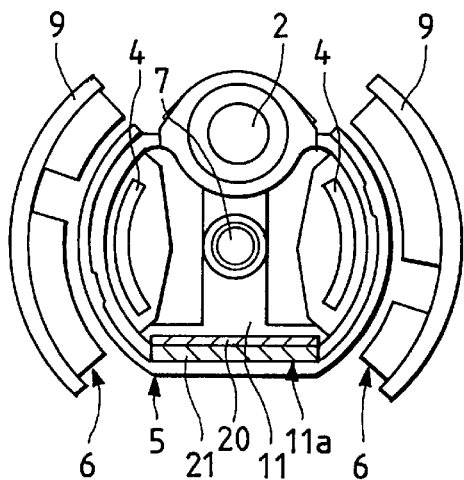
FIGS. 3(a) to 3(c) are plan views of objective lens actuators, which are modifications of the first embodiment.
Figure 3B:
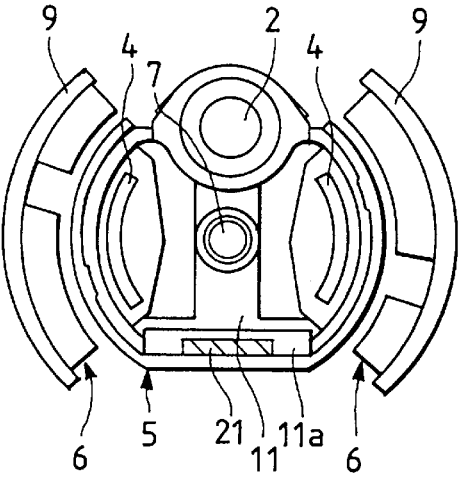
Figure 3C:
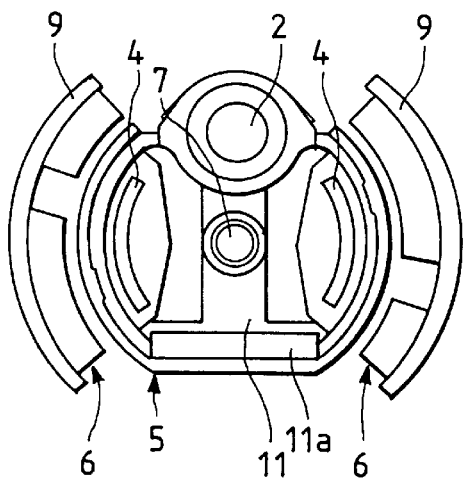

FIGS. 3 (a), (b), (c) are plan views of objective lens actuators, which are modifications of the first embodiment. In these figures, the same parts and components as those in the first embodiment are denoted by the same reference characters.

The objective lens actuator shown in FIG. 3 (a) is provided with both the vibration absorbing member 20 and a weight 21 to fill the gap 11a; the objective lens actuator shown in FIG. 3 (b) is provided with the weight 21 to fill a part of the gap 11a; and the objective lens actuator shown in FIG. 3 (c) is provided with nothing in the gap 11a. As a result of these constructions, advantages similar to those obtained by the first embodiment can be obtained.

It may be noted that the weight 21 in FIGS. 3 (a) and (b) may also be used as a balancer for the movable part.

Figure 4:
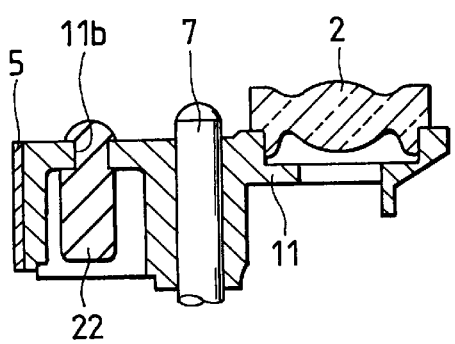
FIG. 4 is a longitudinal sectional view of an objective lens actuator, which is a second embodiment of the invention.

FIG. 4 is a longitudinal sectional view of an objective lens actuator, which is a second embodiment of the invention.

The objective lens actuator according to the second embodiment is distinguished from that according to the first embodiment in that an axially extending through hole 11b is formed in an upper side of a portion of the lens holder 11 which is opposite to the objective lens 2 with the shaft 7 interposed therebetween, and in that a vibration absorbing member 22 is fitted into the through hole 11b so as to be cantilevered.

Here, the vibration absorbing member 22 is made of, e.g., a rubber or low-rigidity elastic strip, and is arranged by, e.g., snap fitting.

Of course, this construction can provide advantages similar to those obtained by the first embodiment. In addition, since the vibration absorbing member 22 made of a rubber or low-rigidity elastic strip is mounted so as to be cantilevered, vibration absorbing performance is extremely improved compared with that in the conventional example.

Further, since the vibration absorbing member 22 is mounted by snap fitting, the mounting operation is made far easier than in the conventional example.

Figure 5:
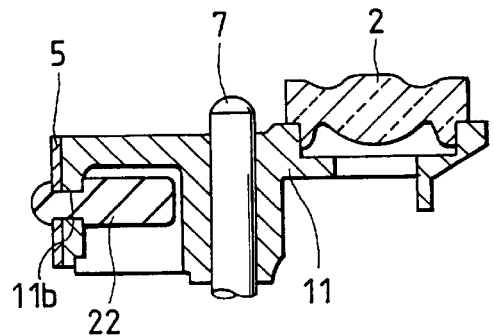
FIG. 5 is a longitudinal sectional view of an objective lens, which is a third embodiment of the invention.
Figure 6:
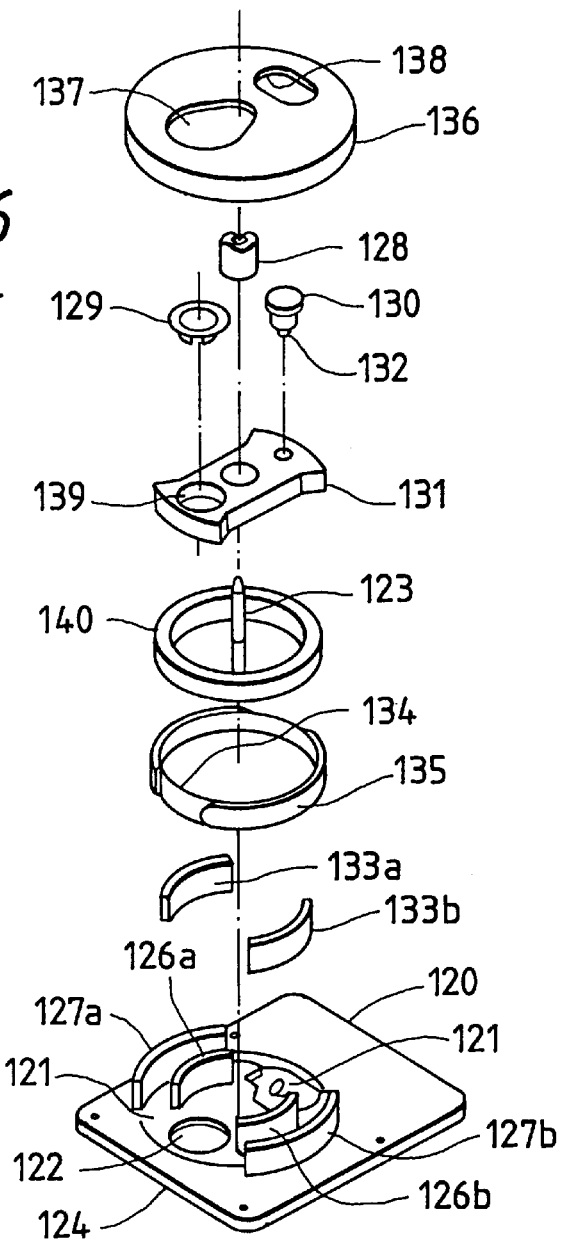
FIG. 6 is a plan view of an objective lens actuator, which is a conventional example.
Figure 7:
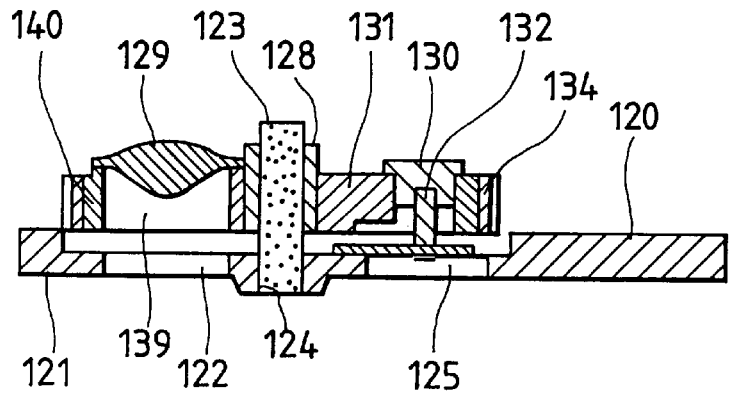
FIG. 7 an exploded perspective view of the conventional objective lens actuator.

FIG. 5 is a longitudinal sectional view of an objective lens actuator, which is a third embodiment of the invention.

The objective lens actuator according to the third embodiment is distinguished from that according to the second embodiment in that the vibration absorbing member 22 is mounted on a lateral side of a portion of the lens holder 11 which is opposite to the objective lens 2 with the shaft 7 interposed.

Of course, this construction can provide advantages similar to those provided by the second embodiment.

It should be noted that vibrations can be absorbed more efficiently if a weight is attached to the tip of the vibration absorbing member 22 in the second and third embodiments of the invention. Further, the objective lens actuators according to the second and third embodiments may also be applied to an objective lens actuator having a drive coil that is not sheetlike.

The aforementioned specifically describes the invention with reference to the embodiments thereof. The invention is not limited thereto, but may be modified in various modes without departing from the scope and spirit of the invention.

As described above, the objective lens actuator of the invention includes a vibration absorbing member interposed between a portion of the objective lens holding body and the sheetlike drive coil, the portion being opposite to the objective lens with the shaft interposed therebetween. Therefore, the vibration absorbing member is not disposed between the magnet and the yoke, and the magnet can be disposed closer to the yoke. As a result, vibrations can be absorbed satisfactorily without impairing the magnetic characteristics, and stability in servo performance can be improved by controlling resonance peaks at high resonant frequencies.

What is claimed is:

1. An objective lens actuator comprising:

an objective lens holding body for holding an objective lens, the objective lens holding body being rotatable about a shaft and slidable along the shaft, the objective lens holding body having a top surface and an outer circumferential side surface extending from the top surface in a direction substantially parallel to the shaft;

a sheetlike drive coil attached to said outer circumferential side surface of the objective lens holding body;

a vibration absorbing member disposed in a gap between an inner circumferential surface of said drive coil and said outer circumferential side surface of the objective lens holding body;

an outer yoke; an inner yoke; and a magnet fixed to said outer yoke, such that said inner yoke is disposed within an opening in said objective lens holding body, said drive coil is disposed between said inner yoke and said outer yoke, and said vibration absorbing member is not interposed between said magnet and the inner yoke;

wherein said vibration absorbing member extends less than all of the way around said outer circumferential side surface of said objective lens holding body in a circumferential direction of said objective lens holding body, and said vibration absorbing member is disposed opposite the objective lens with the shaft interposed therebetween thereby counteracting vibration at a free end portion of the objective lens holding body at an antinode of resonance of the holding body.

2. An objective lens actuator as recited in claim 1, wherein said outer circumferential side surface is concentric with the shaft.

3. An objective lens actuator as recited in claim 1, wherein the objective lens and the vibration absorbing member are arranged in a straight line perpendicularly crossing the shaft with the shaft interposed therebetween, and wherein the sheetlike drive coil comprises drive coil portions disposed on both sides of the straight line.

4. An objective lens actuator as recited in claim 1, wherein said vibration absorbing member comprises one of a rubber strip and a low-rigidity elastic strip.

5. An objective lens actuator as recited in claim 1, wherein said objective lens holding body is cup shaped.

6. An objective lens actuator as recited in claim 1, wherein said vibration absorbing member completely fills the gap between said inner circumferential surface of said drive coil and said outer circumferential side surface of the objective lens holding body.

7. An objective lens actuator as recited in claim 1, further comprising a weight disposed in said gap.

8. An objective lens actuator as recited in claim 7, wherein said vibration absorbing member and said weight completely fill the gap between said inner circumferential surface of said drive coil and said outer circumferential side surface of the objective lens holding body.

9. An objective lens actuator comprising:

an objective lens holding body for holding an objective lens, the objective lens holding body being rotatable about a shaft and slidable along the shaft, the objective lens holding body having a top surface and an outer circumferential side surface extending from the top surface in a direction substantially parallel to the shaft;

a sheetlike drive coil attached to said outer circumferential side surface of the objective lens holding body, wherein a gap is formed between an inner circumferential surface of said drive coil and said outer circumferential side surface of the objective lens holding body;

an outer yoke; an inner yoke; and a magnet fixed to said outer yoke, such that said inner yoke is disposed within an opening in said objective lens holding body, said drive coil is disposed between said inner yoke and said outer yoke, and the gap is not interposed between said magnet and the inner yoke;

wherein the gap extends less than all of the way around said outer circumferential side surface of said objective lens holding body in a circumferential direction of said objective lens holding body, and the gap is disposed opposite the objective lens with the shaft interposed therebetween wherein the gap and the drive coil adjacent said gap function to minimize vibration at a free end portion of the objective lens holding body at an antinode of resonance of the holding body.

10. An objective lens actuator as recited in claim 9, wherein said outer circumferential side surface is concentric with the shaft.

11. An objective lens actuator as recited in claim 9, further comprising a weight disposed in the gap.

12. An objective lens actuator as recited in claim 9, wherein said objective lens holding body is cup shaped.

* * * * *